FIG IV

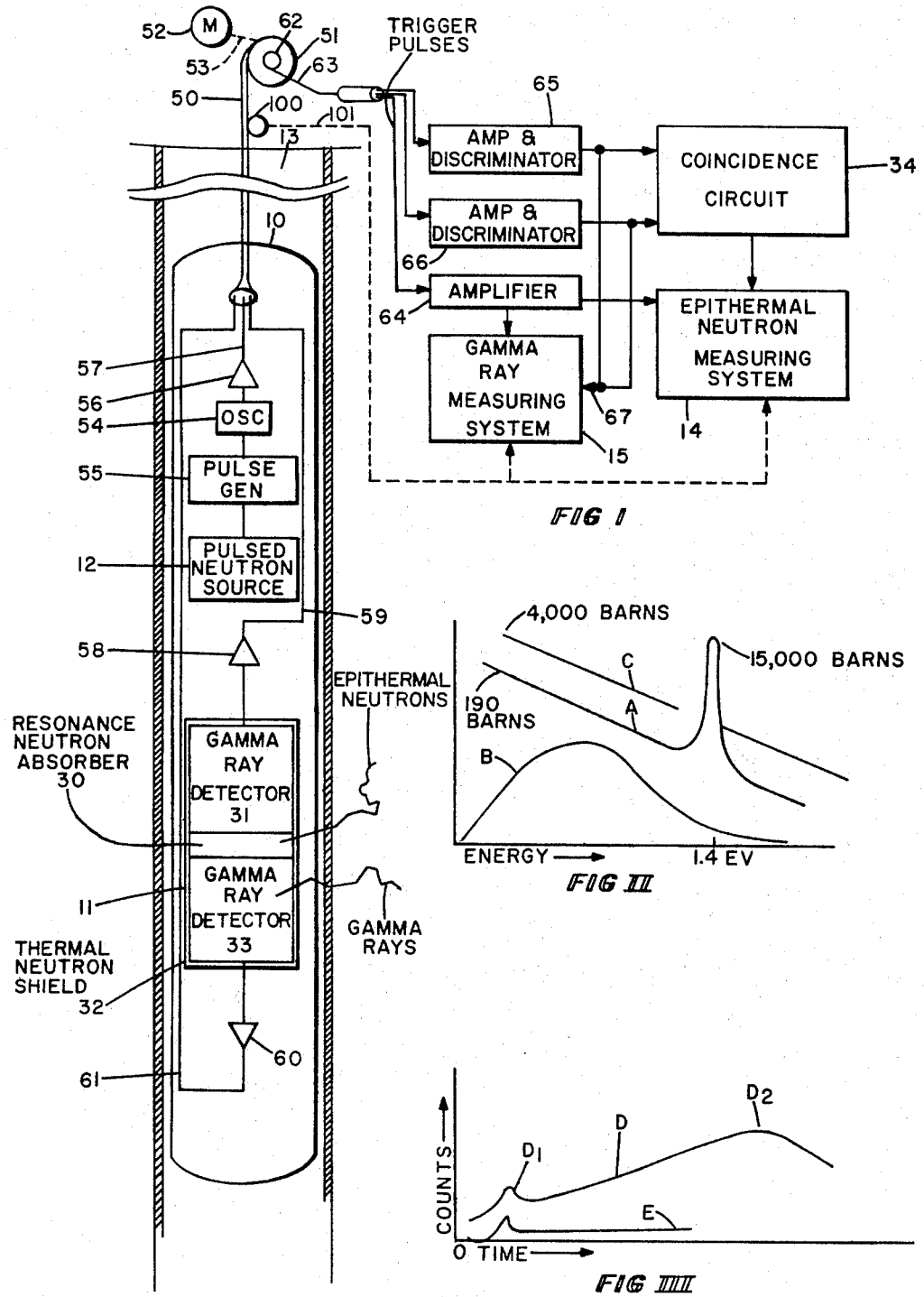

United States Patent Office 3,413,470
Patented Nov. 26, 1968

3,413,470
EPITHERMAL NEUTRON AND GAMMA RAY DETECTOR
Linus S. Allen, Jr., and William R. Mills, Jr., Dallas, Tex., assignors to Mobil Oil Corporation, a corporation of New York
Filed June 18, 1965, Ser. No. 465,078
3 Claims. (Cl. 250—83.1)

ABSTRACT OF THE DISCLOSURE

The specification discloses an epithermal neutron and gamma ray detector comprising a neutron-gamma ray reactive material sandwiched between two gamma ray detectors, the latter of which are coupled to a common coincidence circuit. The neutron-gamma ray reactive material has a resonance peak for reaction with neutrons of epithermal energy. A single shield having a relatively low absorption cross section for gamma rays and epithermal neutrons and a high absorption cross section for thermal neutrons surrounds the neutron-gamma ray reactive material and the two gamma ray detectors. In the preferred embodiment, the neutron-gamma ray reactive material is of indium while the shield is of boron-10 or lithium-6.

---

This invention relates to a detector for detecting epithermal neutrons and gamma rays and more particularly to a detector for borehole use for detecting epithermal neutrons and gamma rays for differentiating between fresh water- and oil-bearing formations.

In well logging operations, pulsed neutron techniques are directed primarily to oil-salt water differentiation. It has been found that pulsed neutron techniques also may be applicable to oil-fresh water differentiation if very short neutron bursts are employed and measurements made of the time of occurrence of the peak intensity of the resulting thermal neutrons or thermal neutron-capture gamma rays. Measurements of this type are based upon the fact that neutrons generally spend more time in heavy molecules in the slowing down process, especially at low energies below the binding energy of the hydrogen atom. Thus, the thermal neutron peak intensity appears later in time if the fluid is oil rather than fresh water. The time difference, however, is small and porosity variations in the formation may seriously affect the measurements desired. Thus, an accurate measure of porosity additionally is needed as a reference for comparison with the thermal neutron peak intensity.

In accordance with the present invention, there is provided a sensitive detector useful in obtaining a measure of porosity and of thermal neutrons in oil-fresh water differentiation and comprises a unique combination of elements for detecting epithermal neutrons and gamma rays. The detector includes a neutron-gamma ray reactive material having a resonance peak for reaction with neutrons of epithermal energy. The neutron-gamma ray reactive material is positioned between two gamma ray detecting means, each coupled to a common coincidence circuit. A shield surrounds the material and the two detecting means for shielding the material from thermal neutrons. The shield employed has a relatively low absorption cross section for gamma rays and epithermal neutrons and a high absorption cross section for thermal neutrons. The gamma ray detecting means detects extraneous gamma rays which pass through the shield and also gamma rays emitted from the neutron-gamma ray reactive material upon the capture of neutrons, including resonance neutrons. Epithermal neutron measurements are obtained from the coincidence circuit while gamma ray measurements are obtained directly from the outputs of the two detecting means. In the embodiment disclosed, the neutron-gamma ray reactive material is of indium while the shield is of boron-10 or of lithium-6.

In the event that boron is employed, discriminating means is coupled to the detecting means and responsive only to pulses representative of gamma rays detected above about 473 kev. to reduce the effect of 473 kev. gamma rays emitted by the boron upon the capture of thermal neutrons.

In pulsed neutron well logging operations, the detector thus is able to detect both epithermal neutrons and extraneous gamma rays following the neutron bursts while being able to reduce substantially the effect of thermal neutrons which might otherwise seriously interfere with both the epithermal neutron and gamma ray measurements.

When obtaining time measurements in pulsed neutron operations, the detector is expected to provide a sharply defined peak due to epithermal neutrons and a second peak due to thermal neutron-capture gamma rays. The epithermal neutron peak thus will provide a well-defined reference for comparison, on a time basis, with the thermal neutron-capture gamma ray peak.

For further objects and advantages of the present invention and for a more complete understanding thereof, reference may now be had to the following detailed description taken in conjunction with the accompanying drawings wherein:

FIGURE 1 represents the detection system of the present invention as employed in a well logging arrangement;

FIGURES 2 and 3 represent curves useful in understanding the present invention; and FIGURE 4 illustrates in detail the uphole radiation measuring systems of FIGURE 1.

Referring now to FIGURE 1, the detector of the present invention is shown located in a borehole logging tool 10 and is identified at 11. The tool 10 also contains a pulsed neutron source 12 for irradiating the formations traversed by a borehole 13 with bursts of fast neutrons spaced in time. Between neutron bursts, the detector 11 is employed for detecting epithermal neutrons and thermal neutron-capture gamma rays from the formation. The output of the detector is applied to the surface to measuring systems 14 and 15, illustrated in detail in FIGURE 4, which are employed, respectively, for measuring epithermal neutrons and gamma rays. These systems display or record epithermal neutrons and gamma rays detected on time basis whereby the time of occurrence of the epithermal neutron and gamma ray peak intensities may be analyzed for determining the characteristics of the formations.

The detector of the present invention comprises a neutron-gamma ray reactive element 30 having a resonance peak for reaction with epithermal neutrons positioned adjacent at least one gamma ray detector 31. In the embodiment disclosed, the element 30 is of indium and the detector 31 comprises a scintillation crystal coupled to a photomultiplier tube. Extraneous gamma rays from the formations are detected directly by detector 31. Epithermal neutrons are detected by detecting, with detector 31, gamma rays emitted by the indium element 30 upon the capture of neutrons. As is well known, the capture reaction results in the emission of a cascade of gamma rays. Since the capture cross section of indium has a high resonance peak at 1.4 ev., as illustrated by curve A of FIGURE 2, a large number of epithermal neutrons will be detected.

Due to the high-capture cross section of indium for 1.4 ev. neutrons, one would normally expect to obtain good resolution for these neutrons. In neutron well logging operations, however, the thermal neutron population frequently is much greater than the epithermal neutron population in the indium resonance region as illustrated, for example, by curbe B of FIGURE 2. Thus, a considerable number of thermal neutrons from the formations may be captured by the indium. When this occurs, the gamma rays from thermal neutron capture by indium will tend to mask those resulting from the capture of 1.4 ev. neutrons.

We have found that the effect of the thermal neutrons can be reduced substantially by placing a boron or lithium shield 32 around the indium element and gamma ray detector. These elements have a significantly greater capture cross section for thermal neutrons than for epithermal neutrons. An appropriate thickness of either material will therefore shield the detector from thermal neutrons while passing most of the epithermal neutrons. The use of a boron or lithium shield thus significantly improves the resolution of the detector for epithermal neutrons. Curve C of FIGURE 2 illustrates the neutron-capture cross section of boron.

In our particular application, the use of a shield of boron or lithium only also provides a unique solution for allowing measurements to be made with the same detector of both epithermal neutrons and the lifetime of thermal neutrons in the formations. This is due to the fact that boron and lithium also have a low absorption cross section for gamma rays. These materials thus allow thermal neutron-capture gamma rays from the formations and indicative of thermal neutrons to pass freely to the gamma ray detector for measurement purposes. Moreover, the gamma rays emitted by boron and lithium, upon the capture of neutrons, do not interfere with the measurement of the gamma rays from indium and from the formations. This is due to the fact that boron produces predominantly only 473 kev. gamma rays upon the capture of thermal neutrons while lithium produces substantially no gamma rays upon the capture of thermal neutrons. The 473 kev. gamma rays from boron can be discriminated from the gamma rays from indium and from the formations by appropriate energy selection.

In this connection, although indium produces neutron-capture gamma rays having energies (from 6 or 8 mev. to lower energies) in the range of those from the formations, the indium gamma rays can be distinguished from the formation gamma rays on a time basis. More particularly, in pulsed neutron operations, the indium gamma rays from 1.4 ev. neutron-capture will reach a peak in time before those resulting from the capture of thermal neutrons and coming from the formations. This is illustrated by curve D of FIGURE 3 expected when employing the indium element 30, at least one gamma ray detector 31, the boron or lithium shield 32, and when the fast neutron burst lengths employed are of a microsecond or less. The end of the neutron burst is at zero. Peak $D_1$ represents the maximum indium gamma ray intensity from 1.4 ev. neutron capture while peak $D_2$ represents the maximum intensity of gamma rays from the formations.

In the present system, the indium gamma rays from 1.4 ev. neutron capture may be enhanced even further by employing the detector in combination with a coincidence circuit. Referring to FIGURE 1, a second gamma ray detector 33 comprising a scintillation crystal and photomultiplier tube is positioned adjacent the other side of the indium element 30. As previously mentioned, indium emits substantially and simultaneously a cascade of two or more gamma rays upon the capture of a neutron. Thus, upon each neutron capture by the indium, there is a high probability that both detectors 31 and 33 simultaneously will detect a gamma ray from the indium, thereby causing the photomultiplier tubes thereof to produce simultaneous electrical pulses. By coupling the photomultiplier tubes and hence the outputs of the two detectors 31 and 33 to a common coincidence circuit, illustrated at the surface at 34 in FIGURE 1, measurements may be made only of coincident gamma rays detected by the detectors 31 and 33. Coincident gamma rays are expected to be predominantly from the indium element 30 rather than from the formations. Thus, by selecting coincident pulses and hence coincident gamma rays, background radiation from the formations may be reduced.

Curve E of FIGURE 2 reflects a time spectrum obtainable from the output from the coincidence circuit 34. The peak of this curve is due to the epithermal neutrons detected. Curve E may be obtained by application of the output of coincidence circuit 34 to a multichannel time analyzer 40 and read out 41 (see FIGURE 4) which form part of the epithermal neutron measuring system 14. In the present system, the output of coincidence circuit 34 also is applied to a plurality of separate time windows adjusted to cover a time range during which the first peak of curve E is expected to occur. Each time window is coupled to a continuous trace recorder 42, 43, and 44 (FIGURE 4). In this manner, a plurality of continuous traces may be obtained to determine the time of the epithermal peak.

In the present system, thermal neutron-capture gamma rays from the formations are measured by combining the outputs of the gamma ray detectors 31 and 33 for measurement purposes. The combined outputs may be applied to multichannel analyzer 45 coupled to read out 46 for the production of the curve D of FIGURE 2. In addition, the combined outputs of detectors 31 and 33 may be applied to a plurality of separate time windows adjusted to cover a range during which the peak $D_2$ of curve D is expected to occur. Each time window is coupled to a continuous trace recorder 47, 48, and 49. In this manner, a plurality of continuous traces may be obtained to determine the time of the thermal neutron-capture gamma ray peak.

A detailed description of the system employed to carry out borehole logging operations now will be given. Referring to FIGURE 1, the borehole tool 10 is lowered into the borehole by a cable 50 wound and unwound on reel 51 driven by motor 52 and connection 53. The neutron source 12 may comprise a conventional D-T source actuated by oscillator 54 and pulse generator system 55. In producing the curves of FIGURE 3, the width of the neutron bursts may be of the order of a microsecond or less. The period between the pulses may be of the order of 2,500 microseconds. The output of the oscillator 54 also is applied to the surface by way of amplifier 56 and conductor 57 to trigger the uphole instrumentation.

The outputs of detectors 31 and 32 comprise pulses having heights related to the energy of the gamma rays detected and are applied to the surface, respectively, by way of amplifier 58 and conductor 59 and amplifier 60 and conductor 61.

At the surface, pulses are taken from conductors 57, 59, and 61 by way of suitable slip rings and brushes, illustrated at 62 and 63. The trigger pulses from oscillator 54 are amplified at 64 and applied to measuring systems 14 and 15. Pulses from detectors 31 and 32 are amplified, respectively, at 65 and 66. In the event that boron is employed as a shield around the detector, circuits 65 and 66 include single channel pulse height analyzers which are adjusted to be responsive only to pulses having heights representative of gamma rays detected above about 0.6 or 0.7 kev. in order to eliminate the 473 kev. gamma rays produced by boron upon the capture of thermal neutrons. The outputs of circuits 65 and 66 are applied to coincidence circuit 34 for obtaining epithermal neutron measurements and are applied to common conductor 67 for combination in order to obtain the gamma ray measurements.

Referring to FIGURE 4, the output of coincidence circuit 34 is applied to AND gates 70–72 for the production of the continuous traces and to time analyzer 40 for the production of the decay curve. Similarly, conductor 67 is coupled to AND gates 73–75 for the production of the continuous traces and in addition is coupled to time analyzer 45 for the production of the time decay curve. Trigger pulses are applied to the various uphole circuits by way of the amplifier 64 and conductor 76. As illustrated, conductor 76 is coupled directly to analyzers 40 and 45 and to each of a plurality of time delay circuits 80–85 coupled, respectively, to pulse generators 86–91. The outputs of the pulse generators 86–88 are applied, respectively, to open AND gates 70–72 at desired times and for desired durations to allow passage of pulses from circuit 34 to count rate meters 92–94 coupled, respectively, to recorders 42–44. Similarly, the outputs of pulse generators 89–91 open AND gates 73–75 at desired times and for desired durations to allow passage of pulses from conductor 67 to count rate meters 95–97 coupled, respectively, to recorders 47–49. The arrangement shown thus provides a plurality of single channel time windows for selecting radiation detected after each neutron burst for recordation by the continuous trace recorders. The time of occurrence of the time windows is determined by suitable adjustment of delay circuits 80–85, while the duration of the time windows is determined by suitable adjustment of the pulse generators 86–91.

Although circuits for obtaining only six time windows for continuous recording are shown, it is to be understood that additional circuitry may be employed for additional time windows. In measuring the epithermal neutron peak, delay circuits 80–82 and pulse generators 86–88 may be adjusted to provide about one microsecond time window beginning a few microseconds after the neutron bursts and extending to a time period up to 50 microseconds. Delay circuits 83–85 and pulse generators 89–91 may be adjusted to provide 2–10 microsecond time windows beginning at about 5–10 microseconds after the neutron bursts and extending up to about 200 microseconds for obtaining measurements of the termal neutron-capture gamma ray peak.

During logging operations, the charts of the recorders 42–44 and 47–49 are driven in correlation with depth by measuring reel 100 (FIGURE 1) and connection 101 illustrated in FIGURE 4 by arrows 101'. A suitable depth meter, not shown, may be employed to determine the depth when employing the read outs 41 and 46.

In one embodiment, the thermal neutron shield 32 may be about 0.1 cm. thick if of lithium-6. The element 30 may be about .01 cm. thick when of indium. The gamma ray detectors 31 and 33 may comprise conventional sodium-iodide scintillation crystals coupled to Dumont 6292 phototubes. Although not shown, a suitable shield will be positioned between the neutron source 12 and the detector 11. A suitable coincidence circuit 34 may be of the type manufactured by Hamner Electronics Company, Inc., Princeton, N.J., Type 681. The neutron generator 12 may be a Phillips tube fitted for beam sweeping or containing an ion suppressor grid to reduce the fast neutron burst length. The pulse height analyzers of circuits 65 and 66 may be the type manufactured by Hamner Electronics Company, Model No. N–603. The multichannel time analyzers 40 and 45 may be the type manufactured by the Technical Measurement Corp., New Haven, Conn., Model CN–110, including a plug-in Model 211, Time-Of-Flight Logic Circuit.

Having described the invention, it will be understood that modifications will suggest themselves to those skilled in the art, and it is intended to cover all those that fall within the scope of the appended claims.

What is claimed is:

1. In a detecting system wherein a neutron-gamma ray reactive material having a resonance peak for reaction with neutrons of epithermal energy is disposed intermediate two gamma ray detectors, each coupled to a common coincident circuit, the combination therewith of:
   a single shield means surrounding said material and said detectors for shielding said material and said detectors from thermal neutrons,
   said shield means having a low absorption cross section for gamma rays and epithermal neutrons and a high absorption cross section for thermal neutrons,
   said detecting means producing output functions representative predominantly of epithermal neutrons and gamma rays which pass through said shield means and react respectively with said material and with said gamma ray detectors.

2. The system of claim 1 wherein:
said shield means is of lithium.

3. The system of claim 1 wherein:
said shield means is of boron,
said system including energy discriminating means coupled to each of said gamma ray detecting means and responsive only to pulses representative of gamma rays detected above about 473 kev. to reduce the effect of 473 kev. gamma rays emitted by boron upon the capture of thermal neutrons.

References Cited

UNITED STATES PATENTS

| | | | |
|---|---|---|---|
| 2,862,106 | 11/1958 | Scherbatskoy | 250—71.5 |
| 2,867,728 | 1/1959 | Pollock | 250—83.3 |
| 3,032,658 | 5/1962 | Youmans | 250—71.5 |
| 3,102,956 | 9/1963 | Armistead | 250—83.1 X |

ARCHIE R. BORCHELT, *Primary Examiner.*